United States Patent
Robert et al.

(10) Patent No.: US 7,051,584 B2
(45) Date of Patent: May 30, 2006

(54) METHOD AND APPARATUS FOR MEASURING THE WEAR OF A TIRE MOUNTED ON A VEHICLE

(75) Inventors: Michel Robert, Cellule (FR); Bernard Fontanier, Chateaugay (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 33 days.

(21) Appl. No.: 10/836,047

(22) Filed: Apr. 30, 2004

(65) Prior Publication Data

US 2004/0250613 A1 Dec. 16, 2004

Related U.S. Application Data

(63) Continuation of application No. PCT/EP02/12262, filed on May 8, 2003.

(30) Foreign Application Priority Data

Nov. 2, 2001 (FR) .................................. 01 14493

(51) Int. Cl.
*G01M 17/02* (2006.01)
(52) U.S. Cl. ..................................... 73/146; 33/203.11
(58) Field of Classification Search ................ 73/146; 33/203.11; 304/444
See application file for complete search history.

(56) References Cited

U.S. PATENT DOCUMENTS

| | | | | |
|---|---|---|---|---|
| 3,964,303 A | * | 6/1976 | Vexelman et al. | ............. 73/146 |
| 5,365,668 A | * | 11/1994 | Canovas et al. | ......... 33/203.11 |
| 6,763,288 B1 | * | 7/2004 | Caretta et al. | ................. 701/1 |
| 6,922,140 B1 | * | 7/2005 | Hernando et al. | .......... 340/444 |
| 2001/0022802 A1 | * | 9/2001 | Kurata | ........................ 374/45 |

FOREIGN PATENT DOCUMENTS

| | | |
|---|---|---|
| DE | 196 49 506 | 6/1998 |
| DE | 199 57 645 | 5/1999 |
| DE | 199 30 046 | 1/2001 |
| EP | 1 036 674 | 9/2000 |
| GB | 2 351 564 | 1/2001 |

\* cited by examiner

*Primary Examiner*—Edward Lefkowitz
*Assistant Examiner*—Andre Allen
(74) *Attorney, Agent, or Firm*—Buchanan Ingersoll PC

(57) ABSTRACT

The present invention concerns a method for measuring the wear of a tire (2) having tread pattern elements interconnected by grooves, which is mounted on a wheel fitted on an automobile having a chassis and a suspension system (1), the method including, when the vehicle (13) rolling or at rest, the following steps: at a given moment a reference value is measured, which is representative of the distance between, on the one hand, a first point fixed on the suspension system (1) or a second point fixed on the chassis facing the tire (2), and on the other hand the top of at least one of the tread pattern elements opposite, ii) in a first case, at the given moment a reference value is measured which represents a distance measured between the first or second point and the bottom of one of the grooves opposite, or, alternatively, in a second case, another reference value is measured subsequently, which represents a distance measured between the first point and one of the tops, and iii the value measured in i) is compared with the reference value measured in ii) to deduce therefrom, in the first case, a wear datum representing the height of the pattern element by differential measurement at the moment, and in the second case, a wear datum representing the change of wear at the top of the element.

19 Claims, 2 Drawing Sheets

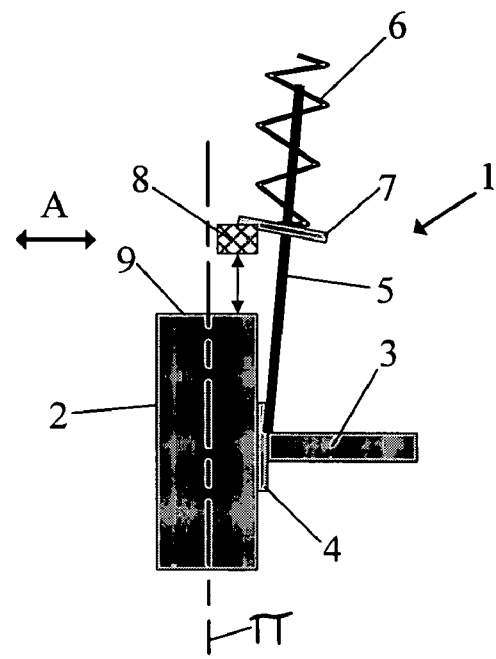
Fig. 1
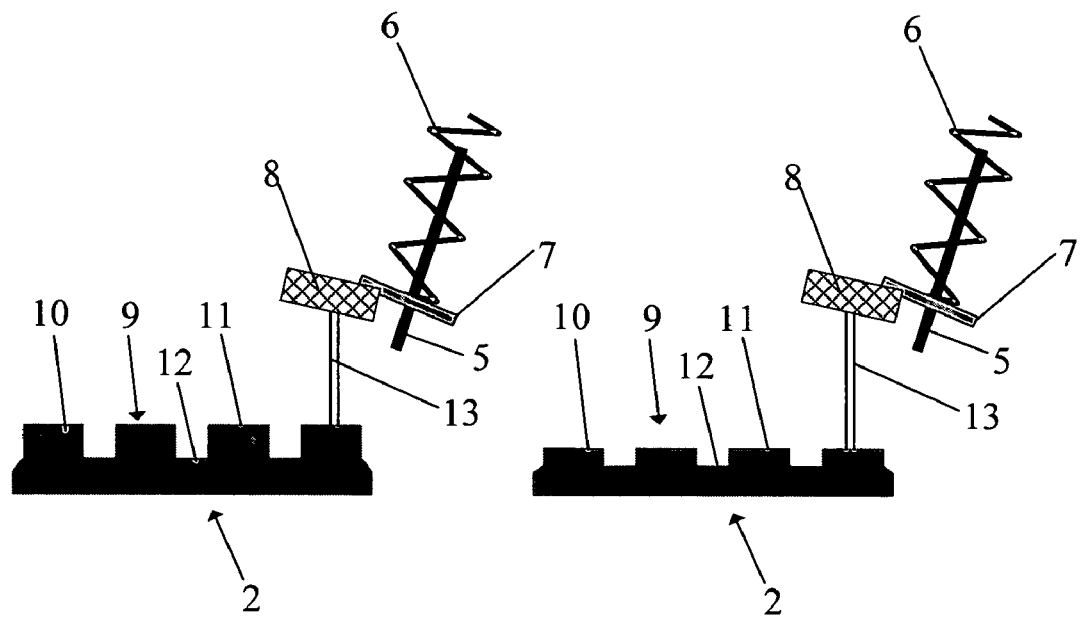
Fig. 2  Fig. 3

METHOD AND APPARATUS FOR MEASURING THE WEAR OF A TIRE MOUNTED ON A VEHICLE

This application is a continuation of PCT/EP02/12262 filed May 8, 2003.

BACKGROUND AND SUMMARY OF THE INVENTION

The present invention concerns a method for measuring the wear of a tire fitted on an automobile vehicle, while the vehicle is rolling or at rest, a suspension system designed for fitting on such a vehicle to perform the method, and a vehicle comprising a suspension system in accordance with the invention.

It is known to provide detectors of the wear of the tread patterns of tires fitted on an automobile vehicle to measure the wear of the tires during rolling.

German patent DE-A-197 45 734 (see FIGS. 2 and 3 thereof) discloses a tire whose tread comprises in its mass a plurality of metallic wires which form electrically conducting loops that extend respectively to different heights within a pattern rib of the tread, and which are connected to a detection circuit underneath the rib. As the tread of this tire is worn away, as will occur as a vehicle fitted with this tire is driven, these loops are broken one after the other to form open switches and the detection circuit delivers a signal representative of these broken loops to an evaluation unit present in the vehicle.

A major disadvantage of this wear detector is the complexity involved in the fabrication of the tire incorporating such a device in its mass, and the possible changes in the detector's components caused by the mechanical stresses and heating that are inevitable as the tire rolls.

One purpose of the present invention is to propose a method for measuring the wear of a tire having a tread with pattern elements interconnected by grooves and mounted on a wheel fitted to an automobile vehicle comprising a chassis, and a suspension system which forms a flexible link between the chassis and the wheel, the method overcoming the above disadvantages and allowing the wear to be measured at any time, whether continuously while the vehicle is rolling or when it is at rest.

To this end, the wear measurement method according to the invention, with the vehicle rolling or at rest, includes the following:
i) at a given moment a value is measured, which is representative of the distance between, on the one hand, a first point fixed on the suspension system facing the tire and occupying a position or a plurality of positions such that the orthogonal projection of the first point on the median circumferential plane of the tire remains an equal distance from that of the axis of the wheel on the plane, or a second point fixed on the chassis facing the tire, and, on the other hand, a point at the top of at least one of the tread pattern elements opposite the first or second point,
ii) in a first case, at the given moment a reference value is measured which is representative of a distance measured between the first or second point and the bottom of one of the grooves opposite the first or second point, or, alternatively, in a second case, a subsequent measurement is made of another reference value representative of a distance measured between the first point and the point at the top of the at least one tread pattern element, and
iii) the value measured in paragraph i) is compared with the reference value measured in paragraph ii) and from this is deduced, in the first case a wear datum representing the height of the tread pattern element by differential measurement at the moment, and in the second case a wear datum representing the change of wear at the top of the element within a given time interval.

According to a first embodiment of a method of the invention, the method comprises the following steps:
i) at a given moment a value is measured, which is representative of the distance between a first point fixed on the suspension system and a point at the top of at least one of the tread pattern elements opposite the first point,
ii) in a first case, at the given moment a reference value is measured, which is representative of a distance measured between the first point and the bottom of one of the grooves opposite the first point, or, alternatively, in a second case, a subsequent measurement is made of another reference value representative of a distance measured between the first point and one of the points at the top of at least one of the tread pattern elements, and
iii) the value measured in paragraph i) is compared with the reference value measured in paragraph ii), and from this is deduced, in the first case a wear datum representing the height of the pattern element by differential measurement at the moment, and in the second case a wear datum representing the change in wear at the top of the element within a given time interval.

According to a second embodiment of the invention, the method comprises the following steps:
i) at a given moment a value is measured, which is representative of the distance between the second point fixed on the chassis and a point at the top of at least one of the tread pattern elements opposite the second point,
ii) at the same given moment a reference value is measured, which is representative of a distance measured between the second point and the bottom of one of the grooves opposite this second point, and
iii) the value measured in paragraph i) is compared with the reference value measured in paragraph ii), and from this is deduced a wear datum representing the height of the pattern element by differential measurement at the moment.

According to another embodiment of the invention, the method comprises the following steps:
i) at a given moment a value is measured, which is representative of the distance between, on the one hand the first point fixed on the suspension system or the second point fixed on the chassis and, on the other hand, the top of at least one of the pattern elements opposite the first or second point,
ii) at the given moment a reference value is measured, which is representative of a distance measured between the first or second point and the bottom of one of the grooves opposite the first or second point, and
iii) the value measured in paragraph i) is compared with the reference value measured in paragraph ii), and from this is deduced a wear datum representing the height of the pattern element by differential measurement at the moment.

According to this embodiment of the invention, the method comprises for example, at any moment or at all times, the following steps:
from the first or second point an incident beam of acoustic or electromagnetic waves (such as ultrasonic waves or light waves, respectively) is emitted towards at least one of the grooves opposite, and towards at least one of the tread element tops adjacent to it, on the one hand a first beam of waves originating from the incident beam and reflected by the tread element top, and on the other hand a second beam of waves originating from the incident beam and reflected by the groove bottom, are received in the form of signals, from the shift between the signals, the delay time of the signal corresponding to the second beam relative to the signal corresponding to the first beam is deduced, and from this, the distance between the tread element top and the groove bottom, representing the height of the tread pattern element(s) at the moment or at all times, is deduced.

Also according to this aspect of the invention, the method advantageously uses acoustic waves such as ultrasonic waves as the waves.

Again according to this embodiment of the invention, the method comprises the following steps:

in a continuous way over at least one revolution of the tire during the rolling of the vehicle, on the one hand n measurements (n>1) are made which are representative of the distances between the first or second point and the respective tops of several of the tread pattern elements opposite the point, and on the other hand n reference measurements are made which are representative of the distances between the first or second point and the bottom of grooves adjacent to the pattern elements, n comparisons are made between these measurements, from which are deduced, by differential measurements, n momentary wear data representing the height of the pattern elements, and an average of these n momentary wear data is formed, from which is deduced a datum relating to the average wear of the tire over its entire circumference during rolling.

According to an aspect of the first example embodiment of the invention, the method also comprises the step of displacing the first point fixed on the suspension system in a direction perpendicular to the median circumferential plane of the tire, to measure the wear of a plurality of tread pattern elements in the axial direction of the tire.

According to another characteristic of the first embodiment of the invention, the first point is attached to a suspension arm of the suspension system.

According to a further characteristic of the first embodiment of the invention, the first point is attached to an abutment against which rests a damper spring of the suspension arm.

According to a further example embodiment common to the first or second embodiments of the invention, the method comprises the step of measuring the values representative of distances by means of a wear gauge, such as a feeler, which is mounted on the first or second point, controlling the movement of the feeler so that it comes in contact with one of the tread element tops and/or with the groove bottom, and then measuring the displacement of the gauge and comparing that displacement with a reference displacement, to deduce therefrom a wear datum of the tread pattern element(s).

Note that wear gauges other than feelers could just as well be used, for example "combs" whose face intended to contact the tread has a profile substantially conforming to that of the latter.

Another purpose of the present invention is to propose suspension systems for implementing this wear measurement method according to the invention, each such suspension system being intended for fitting on an automobile vehicle comprising a chassis and wheels, each wheel being provided with a tire comprising a tread with pattern elements, the suspension system being designed to provide a flexible link between the chassis and the wheels.

To this end, according to a first example embodiment of the invention a suspension system is provided with a wear measurement unit comprising a wear gauge, such as a feeler, the gauge being mounted on a fixed abutment of the suspension arm against which rests a damper spring, in such manner that the gauge can make contact with the tread element top and/or the groove bottom of at least one of the tread pattern elements under the guidance of control means also mounted on the suspension system, the wear measurement unit also comprising means for measuring the displacement of the gauge and for comparing that displacement with a reference displacement and deducing therefrom a wear datum pertaining to the pattern element(s).

As the control means, any means can be used, for example, electric, pneumatic, electro-pneumatic or electromagnetic, in particular, such as jacks.

A suspension system according to a second example embodiment of the invention is provided with a wear measurement unit comprising a pick-up for acoustic or electromagnetic waves, such as ultrasonic or light waves respectively, the pick-up being mounted on a fixed abutment of the suspension arm against which rests a damper spring, and being designed to emit at a certain moment or at all times an incident beam of the waves towards at least one of the grooves opposite it and towards at least one of the tops adjacent thereto, the unit comprising, in addition:

means for receiving in the form of signals, respectively, on the one hand a first beam of waves reflected by the top and originating from then said incident beam, and on the other hand a second beam of waves reflected by the groove bottom and originating from then said incident beam, means for deducing from the shift between the signals, the delay time of the signal corresponding to the second wave beam relative to the signal corresponding to the first wave beam, and means for deducing therefrom the distance between the top and the groove bottom, which represents the height of the tread pattern element(s) at the moment or at any time.

An automobile vehicle according to the invention comprises a chassis, wheels and a suspension system which provides a flexible link between the chassis and the wheels, a tire whose tread comprises pattern elements interconnected by grooves being fitted on each of the wheels.

According to an example embodiment of the invention, the vehicle is such that its suspension system has the characteristics defined earlier, and the vehicle also has a central unit which is designed to receive the wear data pertaining to at least one of the tires coming from the suspension system and is capable of informing the driver of the vehicle about the wear of the tire at any time.

According to another example embodiment of the invention, the vehicle is such that its chassis is provided with a wear measurement unit comprising a pick-up for acoustic or electromagnetic waves, such as ultrasonic or light waves respectively, the pick-up being mounted opposite the tire on a longitudinal member of the chassis or a wall of the chassis that corresponds to the wheel passage zone and being designed to emit, at a given moment or continuously, an incident beam of the waves towards at least one of the pattern grooves opposite it and at least one of the tread element tops adjacent thereto, the unit comprising, in addition:

means for receiving in the form of signals, respectively, on the one hand a first beam of waves reflected by the tread element top and originating from the incident beam, and on the other hand a second beam of waves reflected by the groove bottom and originating from the incident beam, means for deducing from the shift between the signals, the delay time of the signal corresponding to the second wave beam relative to the signal corresponding to the first beam, and means for deducing therefrom the distance between the tread element top and the groove bottom, which represents the height of the pattern element(s) at the moment or at any time, and the vehicle also has a central unit which is designed to receive the wear data pertaining to at least one of the tires coming from the measurement unit, and is capable of informing the driver of the vehicle about the wear of the tire at any time.

Note that when the wave pick-up is mounted on a longitudinal member of the chassis or on a wall of the chassis corresponding to the wheel passage zone (for example, on the vehicle's mudguard adjacent to the tire), the pick-up oscillates during the rolling of the vehicle practically in just one direction which corresponds to the movements imposed by the suspension system when absorbing the load. Thus, these pick-up oscillations have no effect on the aforesaid differential measurements made at a given moment between the bottom of a groove and the top of an adjacent pattern element.

Advantageously, the vehicle according to the invention is such that at least one of its tires has all or part of its tread pattern element tops and/or grooves in the form of concave surfaces such as paraboloids of revolution.

Note that this particular geometry for the tire pattern tops and/or grooves optimizes their reflection of the electromagnetic or acoustic waves emitted by the measurement unit according to the second embodiment mentioned above, and consequently, optimizes the precision of the results obtained.

DESCRIPTION OF THE DRAWINGS

The aforesaid characteristics of the present invention, and others, will be better understood on reading the following description of an example embodiment of the invention, given with illustrative and non-limiting intent, the description relating to the attached drawings in which:

FIG. 1 is a schematic and partial front view illustrating the structure of a suspension system provided with a unit according to the invention for measuring the wear of a tire, FIG. 2 is a locally enlarged view of FIG. 1 illustrating the measurement of wear by a measurement unit according to a first example embodiment of the invention, in the case when the tire tread is such that its pattern elements are not worn, FIG. 3 is a locally enlarged view of FIG. 1 illustrating the measurement of wear by the unit of FIG. 2, in the case when the tire tread is such that its pattern elements are worn.

DETAILED DESCRIPTION OF THE INVENTION

Figure 4:
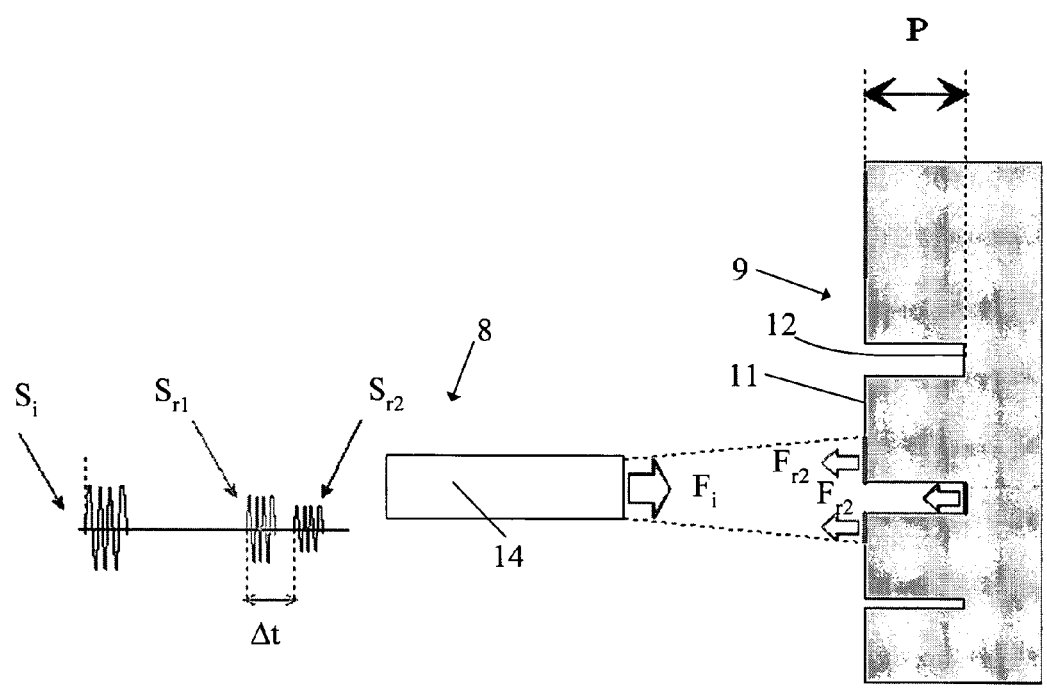
FIG. 4 is a schematic view illustrating the stages of a method according to the invention for measuring the wear of this tire, implemented by a measurement unit according to a second example embodiment of the invention.

FIG. 1 shows a suspension system 1 designed to provide a flexible link between a chassis of an automobile vehicle (not shown) and a wheel of the vehicle, on which is mounted a tire 2 (the corresponding wheel is not visible in FIG. 1). FIG. 1 also shows part of an axle 3 on which the wheel is mounted via a journal bearing 4.

The suspension system 1 comprises generally a suspension arm 5 provided with a damper spring 6 whose end rests on a damper dish 7 which forms a fixed abutment for the spring 6 (the shock-absorbing abutment of the spring adjacent to the chassis is not shown).

According to the invention, the system 1 is provided with a unit 8 for the continuous measurement of the wear of the tire 2 during rolling. The structure and operation of two example embodiments of this measurement unit 8 are shown in detail in FIGS. 2 to 4.

FIG. 2 is a schematic representation, according to a first example embodiment of the invention, of the part of the tread 9 of the tire 2 which is opposite the measurement unit 8 while the tire 2 is rolling on a rolling surface, and which is consequently opposite the surface (not shown). It can be seen in FIG. 2 that the tread 9 has pattern elements 10 in new, unworn condition, with tops 11 interconnected by grooves 12.

The measurement unit 8 comprises a wear gauge 13, such as a feeler in the example of FIG. 2. The feeler is mounted in fixed relationship to the damper dish 7, and is designed to be able to make contact with the top 11 of a tread pattern element 10 located opposite it during the rotation of the tire 2, under the guidance of control means (not shown) which are also mounted on the suspension arm 5 and which, for example, consist of jacks. In addition, means (not shown) can be provided to control the displacement of the gauge 13 in the axial direction of the tire 2, as indicated by the double-headed arrow A in FIG. 1, so that the wear can be measured at various locations across the full width of the tread 9.

The measurement unit 8 also has means (not shown) for measuring the displacement of the gauge 13 and comparing its displacement with a reference displacement, and for deducing therefrom a wear datum pertaining to the pattern element 10.

This measurement unit 8 also has means for communicating the wear data pertaining to the pattern element(s) to a central unit (not shown) provided in the passenger compartment of the vehicle.

The measurement unit 8 of FIG. 2 can for example operate as follows:

To know the degree of wear of a tire 2 fitted to a vehicle during rolling, the driver of the vehicle actuates the control means to bring about a movement of the wear gauge 13 towards a top 11 of a pattern element 10 of the tire 2.

The unit 8 measures the relative displacement of the gauge 13 (see FIG. 3) induced by the wear of the pattern element 10 with which it has made contact, relative to a reference position shown in FIG. 2 (in which there is no wear of the pattern elements 10).

Note that this relative displacement can also correspond to a differential measurement between a position of the gauge 13 in contact with the bottom of a groove 12 (reference position of the gauge 13) and a position of the gauge 13 in contact with the top 11 of the element 10 (measurement position).

The unit 8 then communicates the wear datum corresponding to this relative displacement, to the central unit of the vehicle, which can be interrogated by the driver.

FIG. 4 shows a schematic representation, according to a second example embodiment of the invention, of the part of the tread 9 of the tire 2 which is opposite the measurement unit 8 while the tire 2 is rolling on a surface.

As can be seen in FIG. 4, this measurement unit 8 comprises a pick-up 14 designed to emit ultrasonic waves continuously in the form of an incident beam $F_i$ both towards at least one of the grooves 12 opposite it and towards at least one of the tops 111 adjacent to the groove 12.

The pick-up 14 is provided with means (not shown) for receiving, in the form of respective signals $S_{r1}$ and $S_{r2}$, on the one hand a first ultrasound beam $F_{r1}$ reflected by the top 11 and originating from the incident beam $F_i$, and on the other hand a second ultrasound beam $F_{r2}$ reflected an instant later by the bottom of the groove 11 and originating from the same incident beam $F_i$, to deduce from the shift between these signals $S_{r1}$ and $S_{r2}$ the delay time $\Delta t$ of the signal $S_{r2}$ relative to the signal $S_{r1}$ and, from this delay time $\Delta t$, to deduce the distance between the top 11 and the bottom of the groove 12, i.e. the depth or height of the tread pattern element 10 at any time (see the diagrams of FIG. 4, in which the signal $S_i$ emitted also corresponds to the incident beam $F_i$).

The measurement unit 8 of FIG. 4 can for example operate as follows:

To know the degree of wear of a tire 2 fitted to his vehicle during rolling, the driver of the vehicle actuates the measurement unit 8 so that the ultrasonic pick-up 14 emits the ultrasound beam $F_i$ towards a predetermined zone of the tread 9 which contains the aforesaid top 11 and groove 12. The measurement unit 8 analyses the reflected signals $S_{r1}$ and $S_{r2}$ and calculates the delay time $\Delta t$, and continuously communicates the information on the depth of the tread pattern element(s) to the central unit of the vehicle.

Note that the wear depths P measured for several pattern elements 10 analyzed by the unit 8 during the rotation of the tire 2 can be averaged over time (for example, over a full turn of the wheel). For these measurements to be representative of the average degree of wear of the tire 2 all around its circumference, the driver can advantageously reduce the speed of the vehicle.

Note also that for each wear measurement, the position of the ultrasound pick-up 14 can be pre-adjusted relative to the axial direction of the tire (see the double-arrow A in FIG. 1), such that the incident beam $F_i$ $_{emitted}$ by the pick-up is reflected by a given zone whose degree of wear is to be evaluated, across the width of the tread 9.

While the invention has been described in terms of preferred embodiments, method steps, and components, those skilled in the art will understand that the invention is not thereby limited, and can be practiced with substitutions or equivalents as will fall within the scope of the appended claims.

What is claimed is:

1. A method for measuring the wear of at least one tire mounted on a wheel on a vehicle, the tire having a tread which has pattern elements interconnected by grooves, the vehicle having a chassis and a suspension system that provides a flexible link between the chassis and the wheel, comprising the steps of:
   obtaining, at a given moment, a measurement value representative of a distance between at least one reference point fixed on one of the suspension system and the chassis and a top of at least one of the tread pattern elements opposite the reference point,
   obtaining, at the given moment, a reference value representative of a distance measured between the reference point and a selected point on the tire tread pattern, and
   comparing the measurement value with the reference value and deducing therefrom a wear datum for the tread pattern element.

2. The method as claimed in claim 1, wherein the at least one reference point is at least one point fixed to the suspension system and located opposite the tire, the at least one point being located so that an orthogonal projection of the at least one point on the median circumferential plane of the tire is a fixed distance from an orthogonal projection of a rotation axis of the tire on the plane.

3. The method according to claim 2, further comprising the steps of:
   displacing the at least one point fixed on the suspension system in a direction perpendicular to the median circumferential plane of the tire and obtaining measurement values for a plurality of tread pattern elements over the axial direction of the tire.

4. The method according to claim 2, wherein the at least one point is fixed to a suspension arm of the suspension system.

5. The method according to claim 2, wherein the at least one point is fixed to an abutment against which rests a damper spring of the suspension arm.

6. The method as claimed in claim 1, wherein the at least one reference point is at least one point fixed to the chassis opposite the tire.

7. The method as claimed in claim 1, wherein the reference value is representative of a distance measured between the at least one point and a bottom of one groove opposite the point, and wherein the wear datum represents a height of the pattern element and is determined by differential measurement.

8. The method as claimed in claim 1, wherein the reference value is representative of a distance measured between the at least one point and a top of at least one tread element, wherein, the wear datum represents a change of wear at the top of the element.

9. The method as claimed in claim 1, wherein:
   the step of measuring at the given moment the measurement value is made between a reference point fixed on the suspension system and the top of at least one of the tread pattern elements opposite the first point,
   the step of determining a reference value is done by obtaining at least one of a value representative of a distance between the reference point and a bottom of one of the grooves opposite the reference point and a value representative of a distance between the first point and one of the tops, and
   the step of comparing the measurement value with the reference value is deduces at least one of a wear datum representing a height of the pattern element calculated by differential measurement at the moment and a wear datum representing a change of wear at the top of the element.

10. The method as claimed in claim 1, wherein:
    the step of obtaining a measurement value is done by measuring a distance between a point fixed on the chassis and the top of at least one of the tread pattern elements opposite the point on the chassis,
    the step of determining a reference value done by obtaining a value representative of a distance between the point on the chassis and a bottom of one of the grooves opposite the point on the chassis, and the step of comparing the measurement value and the reference value and deducing the wear datum obtains a datum representing a height of the pattern element by differential measurement.

11. The method as claimed in claim 1, wherein:

the step of obtaining a measurement value is done by measuring a distance from one of a first point fixed on the suspension system and a second point fixed on the chassis to a top of at least one of the tread pattern elements opposite the first or second point, the step of determining a reference value is done by obtaining a value representative of a distance between one of the first point and second point and the bottom of one of the grooves opposite the first or second point, and the step of comparing the measurement value with the reference value and deducing the wear datum obtains a datum representing a height of the pattern element by differential measurement.

12. The method as claimed in claim 1, wherein the steps of obtaining the measurement value and the reference value are done using a wear gauge which is mounted on the at least one point, the method further comprising the steps of:

displacing the gauge so that it comes in contact with the tire, and, measuring the displacement of the gauge and comparing the displacement with a reference displacement, to deduce therefrom a wear datum of the tread pattern element.

13. The method as claimed in claim 1, wherein the steps of obtaining the measurement value and the reference value are done by reflecting a beam of one of acoustic waves and electromagnetic waves from the reference point to the tire tread, the method further comprising the steps of:

directing the beam towards at least one of the grooves opposite the reference point and at least one tread element top adjacent to the groove, receiving in the form of signals a first beam of waves reflected by the tread element top and a second beam of waves reflected by the groove bottom, deducing from a shift between the signals from the first beam and the signals from the second beam a delay time of the signal corresponding to the second beam relative to the signal corresponding to the first beam, and deducing from the time delay a distance between the tread element top and the groove bottom representing a height of the tread pattern element.

14. The method as claimed in claim 13, wherein the step of obtaining the measurement value and reference value is done using a beam of ultrasonic waves.

15. The method as claimed in claim 1, wherein the step of obtaining a measurement value further comprises obtaining continuously during at least one revolution of the tire a plurality n of measurements representative of the distance between the reference point and the tops of a plurality tread elements opposite the reference point, and the step of obtaining the reference value comprises obtaining an equal plurality n, of reference measurements representative of distances between the reference point and a bottom of grooves adjacent to the elements, the method further comprising the steps of:

making n comparisons between the plurality of measurements and reference measurements, and from the comparisons, deducing by differential measurements an equal plurality n of instantaneous wear data which represent a height of the tread pattern elements, calculating an average of the plurality n of instantaneous wear data, and deducing from the plurality n of instantaneous wear data a datum indicating an average wear of the tire around its entire circumference.

16. An apparatus for measuring wear in a tire on a vehicle having a chassis, a suspension system, and wheels each provided with a tire, the tires each having a tread comprising tread pattern elements and grooves, the suspension system comprising a suspension arm designed to provide a flexible link between the chassis and the wheels, the apparatus comprising:

a wear measurement unit comprising a wear gauge mounted on a fixed abutment of the suspension arm against which rests a damper spring, the gauge being disposed to make contact with at least one of a top and a bottom of the groove associated with at least one of the tread pattern elements, control means mounted on the suspension system for controlling the wear gauge, and, means for measuring the displacement of the gauge and for comparing that displacement with a reference displacement, to deduce therefrom a wear datum relating to the tread pattern element.

17. An apparatus for measuring wear in a tire on a vehicle having a chassis, a suspension system, and wheels each provided with a tire, the tires each having a tread comprising tread pattern elements interconnected by grooves, the suspension system comprising a suspension arm designed to provide a flexible link between the chassis and the wheels, comprising:

a wear measurement unit comprising a pick-up for acoustic or electromagnetic waves, the pick-up being mounted on a fixed abutment of the suspension arm against which rests a damper spring, the pick-up being configured to emit an incident beam of waves towards at least one of the grooves opposite it and towards at least one tread element tops adjacent thereto, means for receiving in the form of first and second signals, respectively, a first beam of waves reflected by the tread top and originating from the incident beam and a second beam of waves reflected by the groove bottom and originating from the incident beam, means for deducing from a shift between the first and second signals a delay time of the second signal relative to the first signal, and means for deducing from the delay time a distance between the tread top and the groove bottom representative of the height of the tread pattern elements.

18. An automobile vehicle comprising a chassis, wheels and a suspension system that provides a flexible link between the chassis and the wheels, at least one tire whose tread comprises pattern elements interconnected by grooves mounted on each wheel, the vehicle further comprising:

a wear measurement unit comprising a wear gauge mounted on a fixed abutment of the suspension arm against which rests a damper spring, the gauge being disposed to make contact with at least one of a top and a bottom of the groove associated with at least one of the tread pattern elements, control means mounted on the suspension system for controlling the wear gauge, and, means for measuring the displacement of the gauge and for comparing that displacement with a reference displacement, to deduce therefrom wear data relating to the tread pattern element, and, a central unit to receive the wear data and transmit the wear data to a vehicle operator.

19. An automobile vehicle comprising a chassis, wheels and a suspension system that provides a flexible link between the chassis and the wheels, at least one tire whose tread comprises pattern elements interconnected by grooves mounted on each wheel, the vehicle further comprising:

a wear measurement unit comprising a pick-up for acoustic or electromagnetic waves, the pick-up being mounted on a fixed abutment of the suspension arm against which rests a damper spring, the pick-up being configured to emit an incident beam of waves towards at least one of the grooves opposite it and towards at least one tread element tops adjacent thereto, means for receiving in the form of first and second signals, respectively, a first beam of waves reflected by the tread top and originating from the incident beam and a second beam of waves reflected by the groove bottom and originating from the incident beam, means for deducing from a shift between the first and second signals a delay time of the second signal relative to the first signal, means for deducing from the delay time a distance between the tread top and the groove bottom representative of the height of the tread pattern elements, and a central unit to receive data representing the height of the tread pattern elements of at least one tire from the measurement unit to transmit the data to the operator of the vehicle.

\* \* \* \* \*